United States Patent [19]
Zison

[11] Patent Number: 4,487,054
[45] Date of Patent: Dec. 11, 1984

[54] METHOD FOR PROJECTING LANDFILL GAS COLLECTION RATE OF A SURFACE COLLECTOR

[75] Inventor: Stanley W. Zison, Irvine, Calif.

[73] Assignee: Getty Synthetic Fuels, Inc., Signal Hill, Calif.

[21] Appl. No.: 502,092

[22] Filed: Jun. 8, 1983

[51] Int. Cl.³ .............................................. G01N 7/14
[52] U.S. Cl. ................................................ 73/19; 166/369
[58] Field of Search .................. 73/19; 166/250, 369; 405/129; 48/197 A

[56] References Cited

U.S. PATENT DOCUMENTS

| | | | |
|---|---|---|---|
| 4,026,355 | 5/1977 | Johnson et al. | 166/250 |
| 4,323,367 | 4/1982 | Ghosh | 405/129 |
| 4,442,901 | 4/1984 | Zison | 166/369 |
| 4,444,041 | 4/1984 | Zison | 73/19 |

Primary Examiner—Stephen A. Kreitman
Attorney, Agent, or Firm—Gordon L. Peterson

[57] ABSTRACT

A method for projecting the landfill gas collection rate of a surface collector, including removing some of the cover material from the landfill to expose a test area of the refuse in the landfill and measuring the venting rate of the landfill gas through the test area under essentially steady state pressure conditions in the landfill. Additional cover material is then removed to enlarge the test area and the measuring step is repeated. The measured venting rates are used for projecting the approximate collection rate for a surface collector.

15 Claims, 4 Drawing Figures

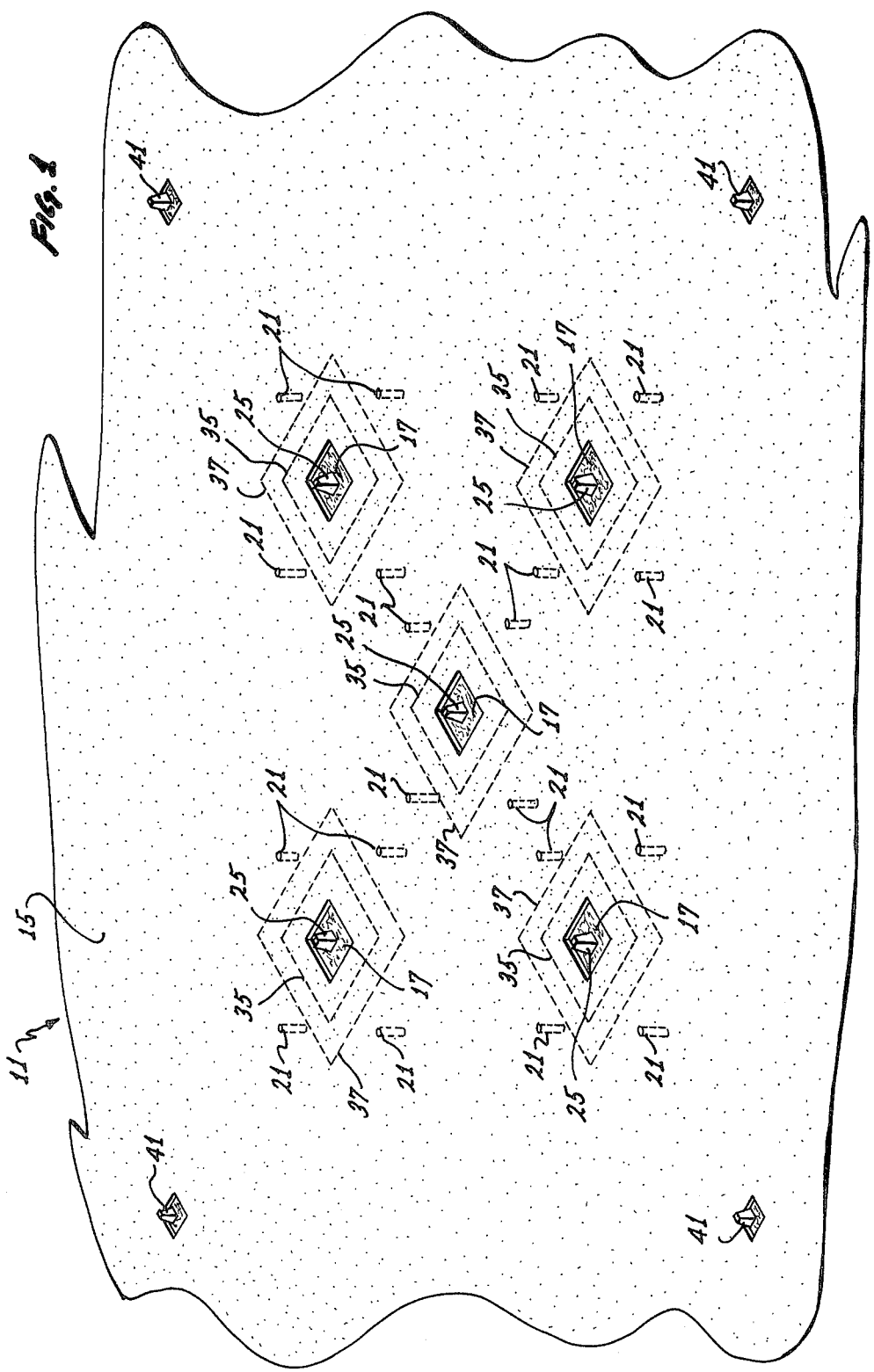

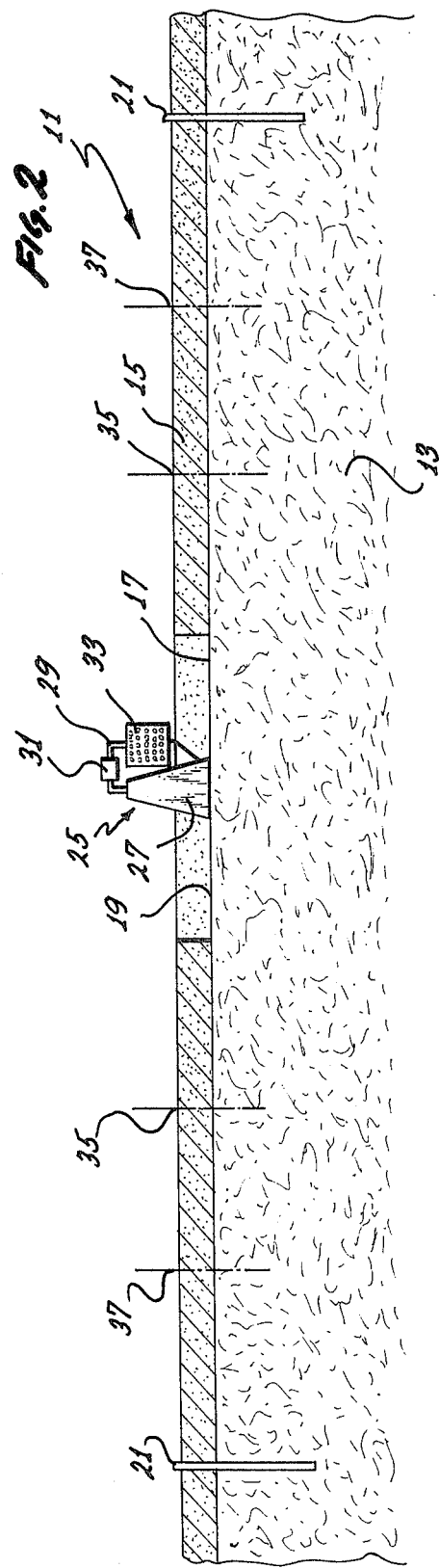
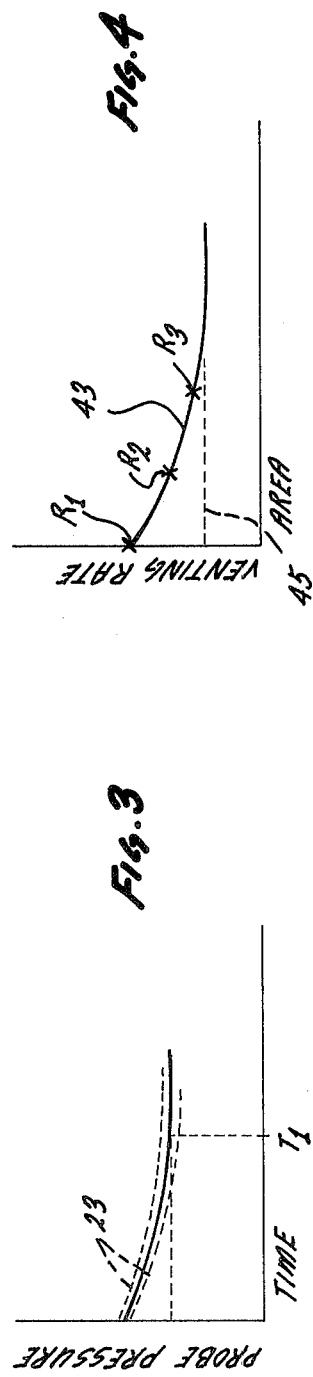

METHOD FOR PROJECTING LANDFILL GAS COLLECTION RATE OF A SURFACE COLLECTOR

BACKGROUND OF THE INVENTION

Decomposition of materials within a landfill produces landfill gas which contains methane. In some instances, the methane concentration and volume are sufficient to warrant recovery of the landfill gas so that the methane can be used as a fuel. To increase the concentration of methane, a landfill gas purification plant can be installed at the landfill.

The recovery of landfill gas requires a substantial investment for the construction of landfill gas recovery wells. Landfills are not homogeneous and do not produce landfill gas at the same rate at all locations within the landfill. Accordingly, the selection of each landfill gas well site is very important in order to maximize gas production and to minimize the number of wells which cannot be used, or cannot be used for long periods, due to inadequate production.

One method of locating landfill gas wells is described in Johnson et al U.S. Pat. No. 4,026,355. Although this method has been used for many years, it would be desirable to have a lower cost method for locating wells at the best possible sites.

Landfill gas is produced by the landfill at a positive pressure. This positive pressure causes some of the landfill gas to flow upwardly to the upper surface of the landfill and vent to the atmosphere. Another way to locate sites for landfill gas wells is to measure the venting rate of the landfill gas in various regions of the landfill. Common assignees copending application Ser. No. 410,311 filed Aug. 23, 1982 now U.S. Pat. No. 4,444,041, and naming Stanley W. Zison as the inventor describes a novel method and apparatus for measuring the flow of landfill gas from a surface.

Historically the most common form of landfill gas well is a deep well that extends for very substantial distances into the refuse of the landfill. Recently it has been proposed to employ a shallow well located near the top of the refuse in the landfill and to allow the positive pressure of the landfill gas to bring the gas to the well. This eliminates the need for boring deep wells, and because over a long period of time the generation rate of landfill gas equals the venting rate, the collection efficiency of a broad surface collector or shallow well is quite good.

The techniques developed heretofore for locating landfill gas wells and determining their collection rates have been directed primarily to the deep landfill gas well. For example, Johnson et al U.S. Pat. No. 4,026,355 referred to above deals entirely with deep wells. Similarly, although Zison application Ser. No. 410,331 referred to above deals with establishing landfill gas venting rates, it is not specifically directed to locating surface collectors or to determining the collection rate of a surface collector.

SUMMARY OF THE INVENTION

This invention provides a novel method for locating shallow landfill gas wells or surface collectors and projecting their collection rates. As used herein, a shallow well or surface collector has reference to a landfill gas well in which collection of the landfill gas by the well occurs at the surface of the refuse or at a relatively shallow depth near the surface of the refuse in the landfill. Surface collectors typically collect landfill gas from a relatively broad area of the landfill, and although they may operate under some negative pressure, they are based on the concept of allowing much of the landfill gas generated at lower depths in the landfill to provide its own pressure head for forcing such landfill gas to the vicinity of the surface collector. Examples of surface collectors are disclosed in common assignee's copending application Ser. No. 355,478 filed on Mar. 8, 1982 now U.S. Pat. No. 4,442,901.

With this invention, some of the cover material of a region of a landfill is removed to expose a test area of the refuse. The venting rate of the landfill gas through this test area can then be measured in accordance with this invention. By removing the cover material, any influence that the cover material may have on the venting rate of the test area can be eliminated. In addition, removal of the cover material enables the venting rate to be measured at the refuse, and this is desirable because the collection of the landfill gas by the collector also occurs in the refuse.

The cover material provides a relatively high impedance path for flow of the landfill gas, and the removal of the cover material for the test area eliminates this impedance throughout the test area. Consequently, the landfill gas under pressure from locations adjacent the test area tends to funnel through the relatively low impedance test area. It has been found that the pressure in the landfill adjacent the test area diminishes over a period of time from a higher to a lower level following removal of the cover material to form the test area. Because the venting rate is a function of pressure in the landfill, the venting rate which is to be measured and used should be the venting rate obtained under essentially steady state pressure conditions. Because of the nonhomogenous nature of the landfill and various factors which affect landfill pressure such as weather conditions and moisture, a truly steady state pressure condition may never exist. Accordingly, the essentially steady state pressure condition referred to herein means the pressure condition in the landfill after the pressure relieving effect of removal of the cover material has essentially dissipated.

After the measuring step, additional cover material is removed to enlarge the test area and the measuring step is then repeated for the enlarged test area. At least two, and preferably at least three, removing and measuring steps are used.

Generally, the measured venting rates will decrease as the test area is enlarged and a plot of venting rate versus area of the test area can be plotted. This can be used in various ways to project the approximate venting rate of the region of the landfill within the test area and contiguous the test area. For example, according to a preferred technique, it is preferred to find the venting rate at which further enlargements of the test area produce little or no significant change in the venting rate, i.e., the essentially flat portion of the curve. This venting rate is approximately the venting rate of the larger region of the landfill if the cover material were removed from such larger region and may be the projected collection rate for a surface collector installed at such region and having its collection area at or in the refuse. This flat part of the curve can be located by repeating the steps of removing additional cover material and measuring until the flat part of the curve can be identified by plotted points or by extrapolation. Of course, because of the nonhomogeneous nature of the landfill, what is referred to herein as the flat part of the curve may not be truly flat.

Although the test area can have different configurations, it preferably has an aspect ratio of about 1-to-1. Thus, a square or a circular configuration is preferred over greatly elongated or irregular shapes.

The venting rate measurements are carried out under essentially steady state pressure conditions. The steady state pressure conditions are preferably determined by utilizing a plurality of pressure probes extending through the cover material into the refuse in the region of the landfill being tested but outside of the test area. Alternatively, the steady state pressure conditions can be determined by making periodic or continuous venting rate measurements and using those venting rate measurements which are reduced and more steady or level as these are the venting rates which exist under steady state pressure conditions in the landfill.

The measuring of the venting rate need not, and preferably does not, involve measuring the flow of all of the landfill gas from the surface of the test area. Rather, the venting rate of the test area can be measured by measuring the venting rate of a selected portion, such as a central portion, of the test area. This technique assumes that the venting rate across the test area is relatively uniform.

Although the venting rate can be measured in various different ways, it is preferred to use an apparatus of the type disclosed in Zison application Ser. No. 410,331. As such, measuring may include allowing the landfill gas venting from the test area to flow through the measuring device and measuring such flow.

Although the method can be carried out with one or more test areas, for better results, it is preferred to provide a plurality of test areas. The results from the test areas can then be statistically processed, such as by averaging them, to project the venting, and therefore collection, rate.

The venting rate of a landfill will vary from day to day depending upon various factors such as barometric pressure. Accordingly, it is desirable to make diurnal adjustments to the measured venting rates. This can be accomplished, for example, by measuring the venting rate of the landfill gas through the cover material in the region of the landfill under study, but outside of the test area.

If the measured venting rates are sufficient to warrant the installation of a landfill gas recovery well, then such a well can be installed in the region of the landfill under study. The collection rate projections provided by this invention can best be used to determine whether or not a surface collector is to be installed.

This invention, together with additional features and advantages thereof may best be understood by reference to the following description taken in connection with the accompanying illustrative drawing.

BRIEF DESCRIPTION OF THE DRAWING

FIG. 1 is a perspective view of a landfill in which a preferred form of the method of this invention is being carried out.

FIG. 2 is an enlarged fragmentary sectional view through one of the test areas.

FIG. 3 is a plot of pressure versus time for the pressure probes for one of the test areas.

FIG. 4 is a plot of average adjusted venting rate versus area of the test areas.

DESCRIPTION OF THE PREFERRED EMBODIMENT

FIG. 1 shows a region of a landfill 11 of the type which comprises refuse 13 and cover material 15 (FIG. 2). The refuse 13 is of the nonhomogenous type commonly found in landfills, and it decomposes to produce a landfill gas which comprises methane and impurities such as water, carbon dioxide, and trace hydrocarbons.

In the first step of the process, some of the cover material 15 is removed to provide identical test areas 17. Although one or more of the test areas 17 can be provided, in the embodiment illustrated, five of the test areas 17 are illustrated with all of the test areas being spaced from each other. The test areas 17 can be arranged in many different patterns. In the embodiment illustrated, there is a center test area 17 and four outside test areas 17 on the four sides of the center test area, respectively, with the outside test areas being equally spaced from the center test area and with the spacing between the outside test areas being equal.

As shown in FIG. 2, a portion of the cover material 15 is removed to expose an upper surface 19 of the refuse 13 at the test area 17. Of course, some of the refuse 13 can be removed along with the cover material 15, if desired, in forming the test areas. Although each of the test areas 17 could be of a different size and configuration, preferably they are of the same size and configuration. In the embodiment illustrated, each of the test areas 17 is essentially square as viewed in top plan.

The area of each of the test areas 17 is small in comparison with total surface area of the landfill 11. For example, each of the test areas 17 after the first stage removal of the cover material 15 may be a 20 foot by 20 foot square.

A plurality of pressure probes 21 are provided outside of the test areas 17 but closely adjacent, e.g. within 5 feet of the test areas. Although various different patterns and arrangements can be used, in the embodiment illustrated, there are four of the probes 21 associated with each of the test areas 17 with one of the probes being on each of the sides of the associated test area. Preferably, the probes 21 are equally spaced from the center of the associated test areas 17. It is also desirable, but not essential, to have the probes 21 approximately equally spaced from each other.

Prior to removing the portions of the cover material 15 to form the test area 17, the pressure in the refuse 13 adjacent the cover material is relatively high because the cover material forms a relatively high impedance path for the landfill gas. However, when test areas 17 are provided, each of them provides a direct low impedance path to the atmosphere. Consequently, there is a venting or release of some of the pressure within the refuse 13 through each of the test areas 17. Because the refuse 13 continuously generates landfill gas and because the area of the test area 17 is small in relation to the total surface area of the landfill, this pressure release and consequent drop of pressure at the probes 21 takes place over a length of time, and ultimately, an equilibrium or essentially steady state pressure condition exists at the probes 21.

This is illustrated in FIG. 3 for one of the test areas 17. FIG. 3 is a plot of probe pressure versus time with each of the curves 23 being for one of the four probes associated with that test area 17. In FIG. 3 steady state pressure conditions begin at time $T_1$ at which all of the four pressure curves are essentially flat. When the probes 21 as shown in the graph of FIG. 3 indicate that essentially steady state conditions have been reached, the venting rate for the associated test area can be measured. One set of the curves of FIG. 3 is plotted for each of the test areas 17.

After essentially steady state pressure conditions have been obtained in the landfill for one of the test areas 17 as shown by the pressure probes 21 for that test area, the venting rate of the landfill gas through that test area is measured. Although the venting rate can be measured in different ways, it is preferred to use a measuring device 25 of the type shown in Zison U.S. patent application Ser. No. 410,552 which is referred to above and which is incorporated by reference herein. Generally, the measuring device 25 comprises an open ended receiver or flux box (FIG. 2), a conduit 29 leading from the upper end of the receiver, a flow meter 31 for measuring the flow of gas flowing through the conduit 29 and a dynamic pressure attenuator 33 coupled to the discharge end of the conduit 29 for materially reducing the effect of the dynamic pressure of the wind on the discharge of the landfill gas from the discharge end of the conduit 29 while imposing no more than a negligible back pressure on the conduit 29, the flow meter 31, and the receiver 27. Although the receiver 27 can be of various configurations, it is preferably in the form of a truncated cone or prism having an open bottom which is placed on the upper surface 19 of the refuse 13 at a central region of one of the test areas 17. Accordingly, landfill gas from the test area 17 immediately below the receiver 27 enters the receiver and flows through it, the conduit 29, the flow meter 31, and the dynamic pressure attenuator 33 to the atmosphere. Thus, the flow meter 31 provides readings of the volume of landfill gas flowing through the measuring device 25 during any given time period. In other words, the venting rate in, for example, cubic feet of landfill gas per day per square foot can be determined from the flow meter readings.

The venting rate for each of the test areas 17 is determined in the same manner after the probes 21 for that particular test area indicate that steady state pressure conditions have been achieved. This can be determined using the same measuring device 25 and moving it from test area to test area or by employing separate measuring devices. This latter approach is preferred.

Next, an additional portion of the cover material around each of the test areas 17 is removed to enlarge the test areas 17 so that each of them has a perimeter 35. Preferably each of the test areas 17 is enlarged the same amount and in a manner to maintain the same general geometric configuration of the test areas. For example, in the embodiment illustrated, the perimeters 35 are each 30 feet by 30 feet and represent a significant area enlargement for the test area. Following the enlargement of each of the test areas 17, the venting rate for each of the test areas is measured with the measuring device 25 under essentially steady state pressure conditions in the same manner as described above.

The test areas 17 can be enlarged any desired number of times with each of the enlargement steps followed by measurement of the venting rate as described above. In the exemplary embodiment illustrated, the test areas 17 are enlarged one additional time to provide each of the test areas with a perimeter 37 for which the venting rate is measured by the measuring devices 25 as described above. For example, the test areas 17 may be enlarged by the perimeter 37 to a 60 foot by 60 foot square.

Preferably conditions in the landfill 11 outside of the test areas 17 are monitored during the testing and for this purpose, measuring devices 41 are employed at locations within the region of the landfill under test but spaced somewhat, e.g. within 50 feet, from the test areas 17. The measuring devices 41 are placed on the upper surface of the cover material 15, and in the embodiment illustrated, four of the devices 41 are utilized. Venting rate measurements are taken continuously or intermittently at each of the devices 41 to permit monitoring of the venting rate of the landfill gas through the cover material for at least the day or days during which the venting rate measurements of the test area are being made. The measured venting rates from the devices 41 can be statistically processed, such as by averaging, to determine the short term venting rate changes occurring in the landfill during the testing period due to natural environmental causes such as changes in barometric pressure.

The venting rates measured by the devices 25 can be adjusted in accordance with the venting rate changes of the landfill gas through the cover material as measured by the devices 41. For example, if the venting rate for one of the test areas is measured over one hour and averages $n_1$ cubic feet per hour then the average venting rate for that test area over the remaining hours of that day can be calculated by $$n_2 = (n_1 d_1)/d_2$$

where
- $n_2$ is the average venting rate of that test area for the remaining 23 hours,
- $d_1$ is the average venting rate as measured by the four devices 41 over the same 23 hour period, and
- $d_2$ is the average venting rate as measured by the four devices 41 over the same 1 hour that $n_1$ is measured.

The adjusted venting rate for that test area is the weighted average of $n_1$ and $n_2$. This same procedure can be repeated for each area or size of each of the test areas 17.

Following the diurnal adjustments, there are three adjusted venting rates for each of the test areas 17 and these venting rates correspond to the initial test area and to the test areas defined by the perimeters 35 and 37, respectively. The adjusted venting rates for the original or initial test areas 17 are then statistically processed as by averaging to provide a single averaged adjusted venting rate. The adjusted venting rates for each of the enlarged test areas is then processed in the same manner so that there are a total of three averaged adjusted venting rates, $R_1$, $R_2$ and $R_3$ (FIG. 4), corresponding, respectively, to the original test areas and the two enlargements thereof. These venting rates can then be used to project the approximate venting rate of the region of the landfill under test if the cover material 15 were removed from such region.

More specifically, these three averaged adjusted venting rates are used to project a venting rate which is essentially independent of further enlargement of the test areas. To accomplish this, a plot of averaged adjusted venting rate versus test area area can be constructed as shown in FIG. 4 with the three averaged adjusted venting rates $R_1$, $R_2$ and $R_3$ yielding a curve 43. When this is done, the venting rate per unit area generally decreases as the area of the test area 17 increases and the venting rate 45 at the essentially flat part of the curve or the asymptote of the curve can be determined by plotting of points or by extrapolation. Of course, if additional venting rates are necessary to reasonably accurately select the asymptote, they can be provided by further incremental enlargements of the test areas 17. As is often the case with test data, the points plotted in FIG. 4 will most likely not all lie perfectly along the curve 43 and the curve that is constructed will typically represent an average or compromise among the plotted points.

The foregoing method can be used to project the venting rate of a relatively large region of the landfill 11 even though the test areas 17 are relatively small. For example, the region may be 400 feet by 400 feet square in the embodiment illustrated. The venting rate 45 is in the projected collection rate of a surface collector installed in such region and having its collection area at or in the refuse 13. If the projected collection rate is sufficient, a surface collector can be installed in the tested region of the landfill 11 in accordance with Zison application Ser. No. 355,478.

Although an exemplary embodiment of the invention has been shown and described, many changes, modifications, and substitutions may be made by one having ordinary skill in the art without necessarily departing from the spirit and scope of this invention.

I claim:

1. A method of projecting the landfill gas collection rate of a surface collector from a region of a landfill wherein the landfill comprises refuse covered by a layer of cover material, said method comprising:
   removing portions of the cover material from said region of the landfill in a plurality of removal stages to provide at least one exposed test area and to make an incremental enlargement of the test area in each successive removal stage;
   measuring the venting rate of the landfill gas through the test area under essentially steady state pressure conditions following each of a plurality of removal stages; and
   using the measured venting rates for projecting the approximate collection rate for a surface collector at said region of the landfill.

2. A method as defined in claim 1 wherein there are at least three of said removal stages and said step of measuring is carried out following each of at least three of said removal stages.

3. A method as defined in claim 1 wherein the venting rates per unit area generally decrease as the area of the test area increases and said steps of removing and measuring are carried out at least until the venting rate per unit area does not materially decrease with an increase in the area of the test area.

4. A method as defined in claim 1 wherein said step of measuring is carried out in a central region of the test area.

5. A method as defined in claim 1 including adjusting the values of the venting rates obtained in said step of measuring in accordance with venting rate changes of landfill gas through the cover material occurring at least during the time said steps of removing and measuring are carried out.

6. A method as defined in claim 1 including carrying out said steps of removing and measuring for at least one additional test area in said region of the landfill, said step of utilizing includes utilizing the measured venting rates for all of said areas for projecting said approximate collection.

7. A method as defined in claim 1 wherein said step of measuring includes allowing the landfill gas venting from a portion of said test area to flow through a measuring device and measuring the flow of the gas through the measuring device.

8. A method as defined in claim 1 including making pressure measurements in the refuse in said region outside the test area to determine when said essentially steady state pressure conditions exist.

9. A method as defined in claim 1 wherein said test area has an aspect ratio of about 1 to 1.

10. A method of obtaining landfill gas from a region of a landfill in which refuse is covered by a layer of cover material comprising:
    removing some of the cover material of said region of the landfill to expose at least one test area of the refuse;
    measuring the venting rate of the landfill gas through the test area under essentially steady state pressure conditions in the landfill;
    removing additional cover material to enlarge the test area subsequent to said step of measuring;
    repeating said step of measuring for the enlarged test area;
    using the measured venting rates for projecting the approximate collection rate of a surface collector for said region of the landfill; and
    installing a surface collector in said region.

11. A method as defined in claim 10 including repeating said steps of removing additional cover material and measuring at least until the venting rate does not materially decrease with an increase in the area of the test area.

12. A method of projecting the landfill gas collection rate of a surface collector from a region of a landfill wherein the landfill comprises refuse covered by a layer of cover material, said method comprising:
    removing some of the cover material of said region of the landfill to expose at least first and second test areas of the refuse with said test areas being spaced apart;
    measuring the venting rates of the landfill gas through the first and second test areas under essentially steady state pressure conditions in the landfill adjacent the test area at which the measuring is being carried out;
    said step of measuring including placing a venting rate measuring device on said first test area, allowing the landfill gas from at least a portion of said first test area to flow through the measuring device and measuring the flow of the landfill gas through the measuring device;
    removing additional cover material from the landfill to enlarge the first and second test areas;
    repeating said step of measuring for the enlarged first and second test areas; and
    using the measured venting rates for projecting the approximate collection rate for a surface collector at said region of the landfill.

13. A method as defined in claim 12 including inserting pressure probes through the cover material and into the refuse of said region of the landfill at locations outside said first and second test areas and using said pressure probes to detect when essentially steady state pressure conditions exist in the landfill.

14. A method as defined in claim 12 including repeating said step of removing additional cover material to further enlarge the first and second test areas and repeating said step of measuring for the further enlarged first and second test areas.

15. A method as defined in claim 12 including placing a plurality of venting rate measuring devices on the cover material of said region outside of said first and second test areas, measuring the venting rate of the landfill gas through the cover material using said venting rate measuring devices, and adjusting the values of the venting rates obtained in said steps of measuring the venting rate through the first and second test areas in accordance with the venting rate changes of the landfill gas through the cover material occurring at least during the time said steps of removing and measuring the venting rate through the first and second test areas are carried out.

* * * * *